United States Patent [19]

Christiansen et al.

[11] 4,219,205
[45] Aug. 26, 1980

[54] MULTIPLE LIP SEAL

[75] Inventors: Keith W. Christiansen, Fox River Grove; Jerry D. Reichenbach, Carpentersville, both of Ill.

[73] Assignee: CR Industries, Elgin, Ill.

[21] Appl. No.: 18,116

[22] Filed: Mar. 7, 1979

[51] Int. Cl.² .......................... F16J 15/44; F16J 15/32
[52] U.S. Cl. ..................................... 277/208; 277/55; 277/152
[58] Field of Search .............................. 277/53, 55–57, 277/152, 153, 165, 208

[56] References Cited

U.S. PATENT DOCUMENTS

| 3,021,161 | 2/1962 | Rhoads et al. | 277/208 X |
| 3,194,571 | 7/1965 | Peickii et al. | 277/208 X |
| 3,445,121 | 5/1969 | Lineker | 277/208 X |

FOREIGN PATENT DOCUMENTS

| 123283 | 1/1947 | Australia | 277/56 |
| 1750427 | 5/1968 | Fed. Rep. of Germany | 277/508 |
| 937099 | 9/1963 | United Kingdom | 277/53 |
| 1000879 | 8/1965 | United Kingdom | 277/153 |

Primary Examiner—Robert S. Ward, Jr.
Attorney, Agent, or Firm—James T. FitzGibbon

[57] ABSTRACT

A multiple lip seal for oil and like fluids. The seal has an annular metal or like rigid casing portion of generally U-shaped cross section. A seal body is bonded to one flange of the U, and the body includes axially spaced apart, radially extending lips formed integrally with said body. In the preferred form, the flange about which the body is formed extends axially a distance at least as far as the extent of the multiple lip so that there is radial support for each of the lips, while the oppositely directed or other flange of the U-shaped casing remains free from rubber for mounting in a machine counterbore.

The axially inner, intermediate and outer lips have different inside diameters in some cases and have the same diameters in other cases. Preferably, the body is thickest, and the radial extent of the lips is the shortest, at the axially inner portion of the seal. The seal assemblies can be made in either radially inwardly-acting form or in radially outwardly-acting form, depending upon the intended application. The U-shaped flange provides convenience of mounting and enables the minimal amount of rubber to be used, while providing the radial support for the axially inner seal lips referred to above.

7 Claims, 5 Drawing Figures

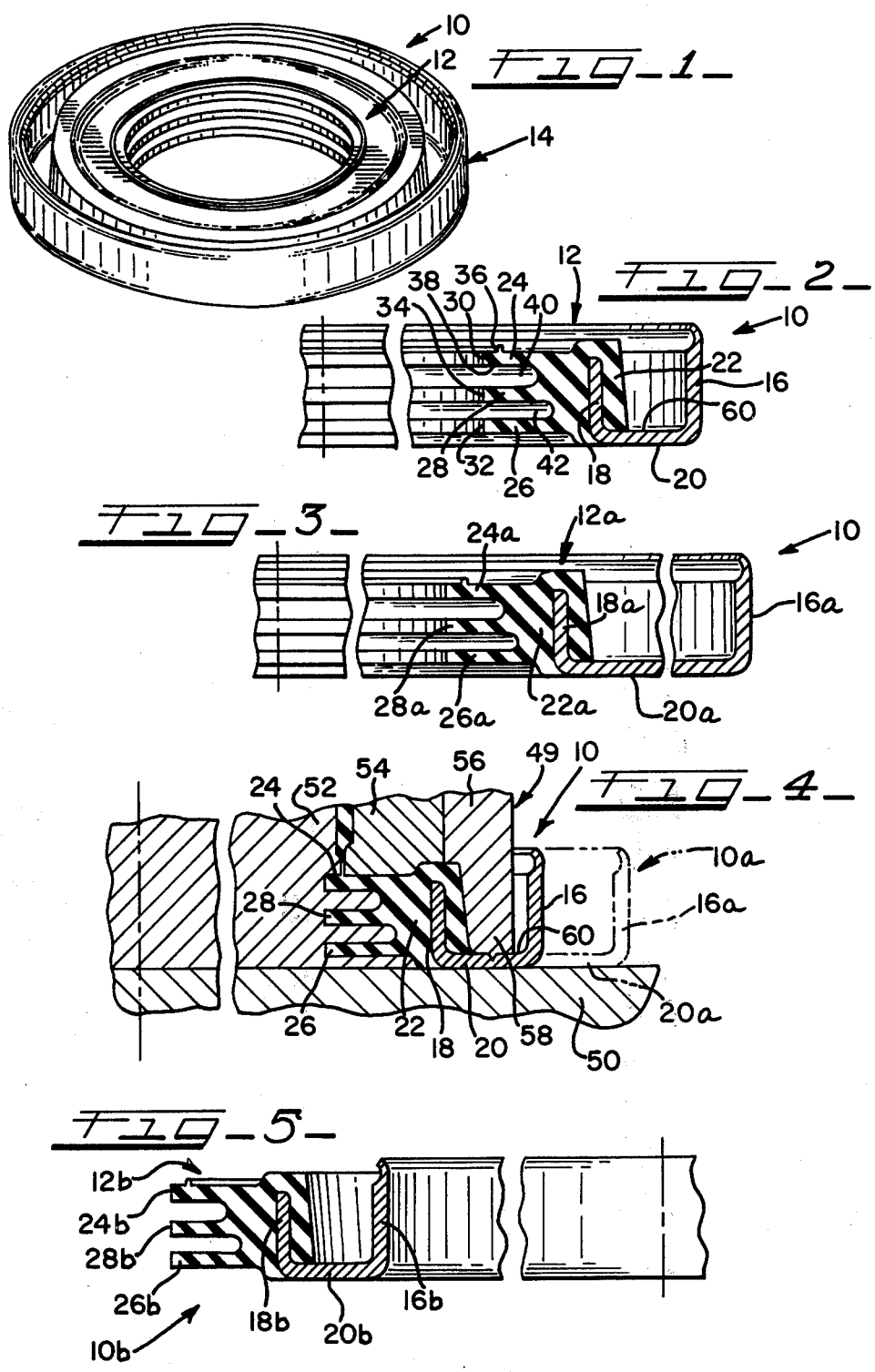

MULTIPLE LIP SEAL

BACKGROUND OF THE INVENTION

The present invention relates generally to multiple lip seals, and particularly to multiple lip oil and grease seals which may be made at reduced cost by reason of being able to be accommodated in a relatively large variety of sealing applications.

In the preferred form, the invention is directed to so-called bonded seals, as distinguished from assembled seals, that is, to seals wherein the lips are molded from natural or synthetic rubber at the same time the seal body is bonded to a casing unit, normally made from metal. The casing serves the dual purpose of providing radial stiffness and location for the seal lips as well as acting to provide a surface for mounting the seal. In this connection, seals of this type are most commonly secured in a counterbore in a machine housing, but they are also sometimes made in a so-called outwardly acting configuration, with the lips extending radially outwardly from the shaft and lying in contact with a flange or other movable part.

Multiple lip oil and grease seals are commonly used in severe service environments, particularly those wherein grease may be the sealed medium. An advantage of seals of this sort is their ability to function effectively even though one or more lips may become abraded by the presence of contamination exterior to the sealed region. Such multiple lip seals having the capability of running at relatively lower temperatures than a seal having a single, extremely wide lip forming a seal band or a path of shaft contact in the sealed application. However, in the past, in spite of the relatively simple, straightforward nature of multiple lip seals, there has been a problem of unduly high cost of manufacturing such seals. Although multiple lip seals are manufactured in large numbers, there is a large range of seal sizes, and consequently, most production runs of any one size seal are quite small. Consequently, tooling and other costs tend to be high in relation to the total number of seals made.

In the past, some seal designs have required that the rubber body of the seal be reinforced throughout a significant part of its axial length. Therefore, some seal designs have utilized a combination of stiffening member and mounting flange as a single unit. Most commonly, this has resulted in a seal construction wherein the annular rubber body from which the lips extended lay entirely inside an annular seal casing. The steel casing was then pressed into a counterbore, with the lips extending radially inwardly to seal an associated shaft.

In other cases, the metal stiffener was surrounded entirely by the seal body with a relatively thin band or annulus of rubber lying radially outside some or all of the stiffening flange. This created a so-called "rubber O.D." (outside diameter) seal, wherein the secondary or static seal was achieved by contact between rubber on the seal unit and metal in the counterbore or other seal assembly. The same design would be applicable to an outwardly acting seal, except that the stiffener would lie radially inwardly of the lips. In the prior art, where there were various O.D.'s for a given I.D. (inside diameter), or vice-versa, the cross-section of the seal body was increased accordingly. Where the difference was large, excess rubber was used. Where the differences were very large, a thick body was usually designed, and the axially extending metal flange was eliminated. This design was also wasteful of rubber; both types of prior art designs required separate tooling for each side. Accordingly, with a shaft of the given diameters being used in association with several different counterbores, several different size seals would be tooled and manufactured, creating an excessively large inventory of a relatively small number of interchangeable parts.

According to the present invention, a second, but inexpensively manufactured, mounting flange is provided in a multiple lip seal which includes an axially extending flange serving to reinforce the body. In this manner, a number of different size stampings or seal casings can be made, differing from each other only in radial size, but having a common inner diameter which serves as a stiffener and body mounting portion. Thereupon, in manufacturing the same tooling can be used to manufacture seals of different diameters, and accordingly, tooling costs may be substantially reduced with the result that lower cost seals may be manufactured.

Accordingly, it is an object of the present invention to provide an improved multiple lip oil seal.

Another object of the invention is to provide an oil seal which is capable of manufacture at decreased cost, and in particular, in which the body can be made from a single tool as opposed to the requirement of being made from a family of tools.

Another object is to provide a multiple lip seal which is easy and reliable to install in use.

Still another object of the invention is to provide a seal which, by its nature, is able to provide a readily accessible, highly effective flash barrier for cooperation with other mold parts used to form the seal.

Another object of the invention is to provide a seal which may be readily manufactured using tooling not requiring change parts for interchangeability, but wherein the interchangeability feature of the seal may be made by the use of parts entirely extrinsic to those used in tooling.

The present invention achieves these and other objects by providing a seal having a casing element comprising two spaced apart, axially extending flanges joined by a radial flange which serves as a flash barrier for a movable mold part, and which includes a seal body portion having a plurality of radially extending sealing lips, including axially inner and outer lips and at least one intermediate lip, with one axial flange of the casing having an extent sufficient to radially overlie at least parts of all of the seal lips.

The manner in which these and other objects and advantages of the invention are achieved in practice will become more clearly apparent when reference is made to the following detailed description of the preferred embodiments of the invention set forth by way of example and shown in the accompanying drawings, wherein like reference numbers indicate corresponding parts throughout.

BRIEF DESCRIPTION OF THE DRAWINGS

FIG. 1 is a perspective view of a multiple lip oil or grease seal made in accordance with the present invention;

FIG. 2 is a vertical sectional view, with portions broken away, showing a cross section of a seal made according to the present invention;

FIG. 3 is a vertical sectional view of a seal similar to that of FIG. 2 but having a casing of a different configuration;

FIG. 4 is a vertical sectional view, with portions broken away, of a portion of a seal made according to the invention, showing the same in place within a mold used to form the seal, and showing, in phantom lines, the same seal with a different outside diameter flange; and FIG. 5 is a vertical sectional view, with portions broken away, showing a seal made according to the present invention and adapted and designed for use in a mold wherein the seal acts radially outwardly.

DESCRIPTION OF THE PREFERRED EMBODIMENTS OF THE INVENTION

Referring now to the drawings in greater detail, FIG. 1 shows one form of seal made according to the invention, showing the invention to be embodied in a seal generally designated 10. This unit has a seal body portion generally designated 12 bonded to a casing generally designated 14. As may be seen by reference to FIG. 2, the casing includes an axially extending, radially outer mounting flange portion 16, a radially inner, axially extending bonding flange 18, the two flanges 16, 18 being radially spaced apart and joined at their margins by a radially extending or offsetting flange 20.

The body 12 of the seal is shown to include a mounting portion 22 surrounding the bonding flange 18, and to include an axially inner, radially extending lip 24, an axially outer, radially extending lip 26 and, in the embodiment, one intermediate lip 28. In the form shown, "axially inner" means toward the sealed region, but the invention does not depend for its operation on which lip is inner or outer; these designations are used for convenience only.

Each of the lips 24, 26, 28 includes a radially inwardly directed, seal-forming surface 30, 32, 34 respectively, and is further defined by radially extending, axially facing side surfaces such as the surfaces 36, 38 in FIG. 1. These surfaces and their counterparts on lips 26, 28 serve to define cavities or spaces 40, 42 between the lips. As may be seen by reference to FIG. 2, the radially extending bonding flange portion 22 has portions which lie radially outwardly of at least a portion of all of the sealing lips 24, 26, 28, thereby adding radial stiffness thereto.

Referring now to FIG. 3, a seal unit generally designated 10a is shown, and this seal includes a seal body 12a, a bonding flange 18a, and a plurality of sealing lips 24a, 26a, 28a, which are substantially identical to their counterparts in the form of seal shown in FIG. 2. However, in the construction of FIG. 3, the radial flange 20a is larger than its counterpart in the seal of FIG. 2. Consequently, the axial mounting flange 16a, although of the same axial extent as its counterpart in FIG. 2, is paced radially farther from the axially extending inner or bonding flange 18a.

From the foregoing, assuming that the two seal bodies are of identical inner diameters, as pointed out, then the seal of FIG. 3 would fit in an application wherein the sealed part, such as a shaft or the like, were identical but wherein the counterbore would be larger.

Referring now to FIG. 4, the manner in which this is achieved is shown. In FIG. 4, in solid lines, a seal is shown which includes the flanges 16, 18, 20, the mounting portion 22 of the body 12, and the lips 24, 26, 28. FIG. 4 also shows a mold generally designated 49, in which the seal is found; the mold includes a lower mold plate 50, a pair of mold inserts 52, 54 which cooperate to define the seal lips and the radially extending inside face, respectively, of the seal, and a relatively movable, radially outer mold part 56 which includes a land portion 58 adapted to make a tight sealing contact with the inner face 60 of the radial casing flange 20.

In molding the seal, the axial movement of the part 56 into snug engagement with the inner surface 60 of the flange 20 precedes movement of the rubber fully into the molding cavity and establishes a flash barrier which prevents flow of rubber from such molding cavity along the walls of the flange 20 where it would be lost. According to the present invention, the radial flange 20 provides a surface with which the land 58 on the outer ring 56 may cooperate to establish the flash barrier, as opposed to mating directly with another mold part. In certain prior art multiple lip seals, the mold parts would register with each other and the flange would be disposed entirely within the molding cavity. According to the present invention, however, existence of this surface provides the two-fold function of serving to establish a flash barrier, and to permit any desired degree of radial offset in the outer or mounting flanges 16, 16a, as will appear.

Referring again to FIG. 4, but now to the phantom line portion of the case generally designated 10a, it will be noted that the axial mounting flange 16a is shown in phantom lines to be attached by a radial flange 20a of greater radial extent than its counterpart 20. From this, it will be appreciated that, inasmuch as the mold parts only act to define the seal body and the lips forming a part thereof, the outer flange does not constitute a part of the seal body, and it may therefore be of any configuration desired.

Accordingly, when tooling for any application having a given shaft diameter, the same mold may be used for seals of various outside diameters. The location of the other axial or mounting flange is determined only by the diameter of the counterbore and does not influence the size or shape of the molded lip. Thus, a number of different seal sizes may be made using the same tooling with different O.D. sizes being made merely by substituting stampings of different sizes.

Referring now to FIG. 5, another form of seal 10a is shown to embody the principles of the invention. In this case, the seal body 12b is the same as its counterpart in the seal of FIGS. 1-4, except that the lips 24b, 26b, 28b extend radially outwardly rather than inwardly. The axially extending bonding flange 18b is now the radially outer flange, while the mounting flange 16b is the radially inner flange, and the bight or portion connecting these flanges is a radially extending flange 20b which is similar to its counterpart 20. The cross sectional shape of the seal body is the same although made in a mold of a different configuration, because of the direction in which the lips extend. The principle of the invention is also applicable to outwardly acting seals such as those shown in FIG. 5. In this case, however, shafts of different diameter are accommodated by sizing the diameter of the mounting flange 16b thereto, and as long as the seal diameter or the diameter at which relative motion takes place is the same, then seals of different mounting flange sizes may be made according to the invention.

It will thus be seen that the present invention provides novel seal units having a number of advantages and characteristics including those pointed out above and others which are inherent in the invention. Several preferred embodiments of the invention having been described by way of illustration, it is anticipated that changes and modifications of the described seal units will occur to those skilled in the art and that such changes and modifications may be made without departing from the spirit of the invention or the scope of the appended claims.

I claim:

1. A multiple lip fluid seal assembly comprising, in combination, a generally annular, rigid seal casing portion and a generally annular elastomeric, primary seal forming portion, said casing portion being generally U-shaped in cross section and having first and second, radially spaced apart, axially extending flanges, and a third, radially extending flange joining said first and second axial flanges together, said second axial flange being adapted to be received within a first part of a sealed mechanism and to form, in cooperation therewith, a fluid-tight secondary seal, said elastomeric portion comprising a generally axially extending body portion bonded to and surrounding said first axial casing flange and a flexible portion for engaging a second part of a sealed mechanism, said flexible portion including a plurality of axially spaced apart sealing lips extending radially from said body portion, including an axially inner lip, an axially outer lip, and at least one lip immediate said inner and outer lips, all of said lips having sealing edges on the portions thereof lying remote from said body portion, with said axial flange lying within said seal body and extending sufficiently axially therethrough so as to have portions lying in radially spaced apart, axially overlapping relation to at least a part of each of said lips so as to provide substantially equal radial stiffness to all of said lips.

2. A fluid seal assembly as defined in claim 1 wherein said plurality of lips comprises three lips.

3. A seal asembly as defined in claim 1 wherein said sealing lips extend radially inwardly from said seal body.

4. A seal assembly as defined in claim 1 wherein said sealing lips extend radially inwardly from said seal body, said sealing edges having substantially the same inside diameter.

5. A seal assembly as defined in claim 1 wherein said sealing lips extend radially outwardly from said seal body.

6. A seal assembly as defined in claim 1 wherein said sealing lips extend radially outwardly from said seal body, said sealing edges having substantially the same outside diameter.

7. A seal assembly as defined in claim 1 wherein said seal body is of generally tapering cross section, having a thicker radial cross section adjacent said axially inner seal end than adjacent said axially outer seal end, whereby said axially inner lip has the smallest radial extent from said body, said axially outer lip has the greatest radial extent, and wherein said intermediate lip has a radial extent intermediate those of said inner and outer lips.

* * * * *